United States Patent
Pilgram et al.

(10) Patent No.: US 6,971,364 B2
(45) Date of Patent: Dec. 6, 2005

(54) FUEL INJECTION SYSTEM FOR INTERNAL COMBUSTION ENGINES WITH GASOLINE DIRECT INJECTION, WHICH INCLUDES OPTIONAL INJECTION INTO THE INTAKE TUBE, AND METHOD FOR OPERATING IT

(75) Inventors: Guido Pilgram, Schwieberdingen (DE); Martin Maier, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 10/229,068

(22) Filed: Aug. 28, 2002

(65) Prior Publication Data

US 2003/0051707 A1    Mar. 20, 2003

(30) Foreign Application Priority Data

Aug. 28, 2001   (DE) ................. 101 41 959

(51) Int. Cl.[7] .............................. F02B 3/00
(52) U.S. Cl. ................. 123/299; 123/431; 123/568.11; 701/104
(58) Field of Search .................. 123/299, 431, 123/568.11, 568.21, 492, 493; 701/104, 105, 701/108, 106

(56) References Cited

U.S. PATENT DOCUMENTS

| | | | |
|---|---|---|---|
| 5,809,957 A | | 9/1998 | Antone et al. |
| 5,832,880 A | * | 11/1998 | Dickey ..................... 123/25 C |
| 5,875,743 A | * | 3/1999 | Dickey ..................... 123/25 C |
| 6,561,157 B2 | * | 5/2003 | zur Loye et al. ........... 123/295 |
| 6,659,071 B2 | * | 12/2003 | LaPointe et al. ........... 123/299 |
| 6,679,224 B2 | * | 1/2004 | Stanglmaier ................ 123/431 |

FOREIGN PATENT DOCUMENTS

| | | |
|---|---|---|
| DE | 199 18 565 A1 | 10/2000 |
| EP | 1 046 803 A2 | 10/2000 |
| EP | 1 046 803 A3 | 10/2000 |
| JP | 2000-265840 | 9/2000 |
| WO | WO 99/42718 | 8/1999 |

* cited by examiner

Primary Examiner—John T. Kwon
(74) Attorney, Agent, or Firm—Ronald E. Greigg

(57) ABSTRACT

A fuel injection system for GDI internal combustion engines, which has a second injection valve in the intake tube, and a method for operating this fuel injection system. By injecting fuel into the intake tube at intervals by means of the second injection valve, the formation of deposits in the intake tube and on the inlet valve, which are produced due to the recirculation of exhaust gas through the exhaust recirculation tube, can be prevented and possibly existing deposits can be broken down.

18 Claims, 1 Drawing Sheet

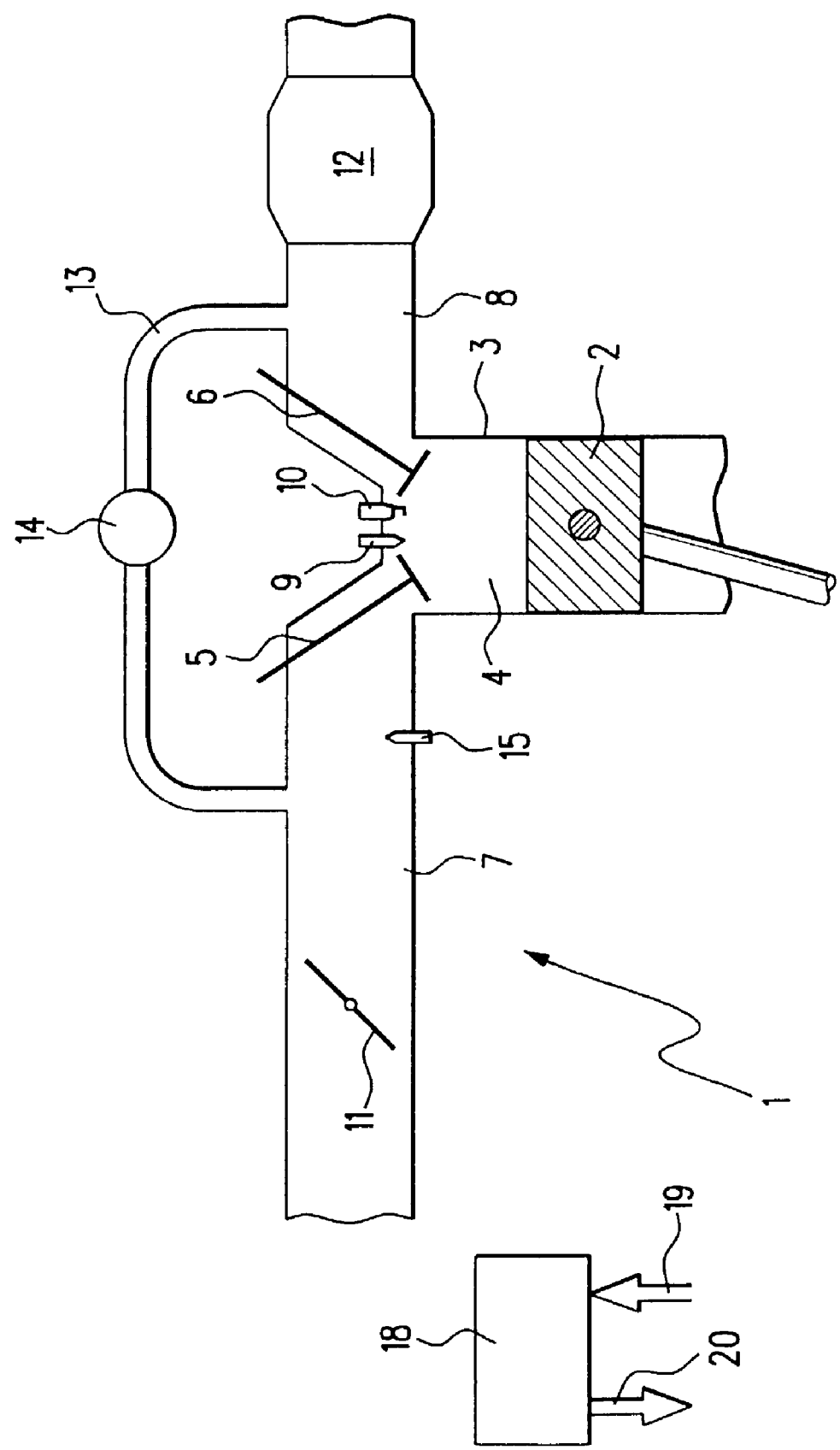

FUEL INJECTION SYSTEM FOR INTERNAL COMBUSTION ENGINES WITH GASOLINE DIRECT INJECTION, WHICH INCLUDES OPTIONAL INJECTION INTO THE INTAKE TUBE, AND METHOD FOR OPERATING IT

BACKGROUND OF THE INVENTION

1. Field of the Invention

The current invention relates to a fuel injection system for internal combustion engines with gasoline direct injection, which has a high-pressure fuel pump, a control unit, and a first injection valve for each cylinder of the engine.

2. Brief Description of the Prior Art

Internal combustion engines with exhaust recirculation and gasoline direct injection (GDI) have the problem of deposits building up in the intake tube and on the inlet valves. These deposits are caused by the amount of soot and partially polymerized hydrocarbons contained in the recirculated exhaust. At the beginning, these deposits are still soft and sticky, but change over the course of time into hard deposits and can lead to the jamming or destruction of moving parts. In the intake section, these deposits pose a threat chiefly to the inlet valves and their valve guides.

In addition, the presence of these deposits leads to a reduction of the free flow cross section in the intake tube, which adversely affects the operating behavior and the power output of the engine.

OBJECT AND SUMMARY OF THE INVENTION

The object of the present invention is to provide a fuel injection system and a method for operating it, which solves the above-mentioned problems of the prior art incurred during operation of an internal combustion engine with GDI.

This object is attained according to the invention for a fuel injection system for internal combustion engines with gasoline direct injection, which has a high-pressure fuel pump, a control unit, and a first injection valve for each cylinder of the engine, by virtue of the fact that at least one second injection valve is provided and that the second injection valve can inject fuel into an intake tube of the engine.

It has turned out that intermittently injecting fuel into the intake tube by means of the second injection valve can prevent deposits from forming. In addition, possibly existing deposits can be broken down. These effects are based on the fact that the fuel injected by means of the second injection valve takes the form of a fine fuel mist in the intake tube and the additives contained in the fuel prevent the formation of deposits by wetting the appropriate surfaces of the intake tube and e.g. the inlet valves. In addition, this fine fuel mist dissolves possibly existing deposits from the intake tube and/or the inlet valves, thus also permitting the effective elimination of possibly existing deposits.

If needed, a second injection valve can also be provided for each cylinder of the internal combustion engine. As a result, the fuel can be injected into the intake tube in the immediate vicinity of the inlet valves, which even more effectively suppresses the formation of deposits. This measure also intensifies the breaking down of existing deposits.

A variant of the invention provides that the second injection valve injects fuel into the intake tube between the point at which an exhaust recirculation tube feeds into the intake tube and a combustion chamber of the engine so that during the injection of fuel into the intake tube, the fuel mist is produced at the point where the danger of deposits is the greatest.

A further modification can include the provision that the second injection valve is embodied as a high-pressure or low-pressure injection valve so that the specific advantages of these designs can also be enjoyed in the fuel injection system according to the invention.

The object mentioned above is also attained according to the invention by means of a method for operating a fuel injection system where in order to prevent deposits in the intake tube and/or on the inlet valve, fuel is injected into the intake tube as needed by the second injection valve.

The above-mentioned advantages are achieved with the method according to the invention.

Another embodiment of the method according to the invention can include the provision that during the warm-up phase of the engine, the second injection valve injects fuel into the intake tube so that in particular, the formation of deposits in the intake tube and on the inlet valves is prevented and so that an additional fuel quantity possibly required for the starting process is injected. As a result, the injection of fuel by the second injection valve does not cause an increase in fuel consumption.

Alternatively, it is also possible when shutting off the engine to inject fuel into the intake tube by means of the injection valve in order to achieve a long holding time of the fuel, both in the intake tube and against the injection valves, and consequently to improve the dissolving of possibly existing deposits.

The need for an injection of fuel into the intake tube by the second injection valve can be determined, for example, by monitoring the vacuum in the intake tube during particular operating states, e.g. when the engine is idling, so that the formation of deposits can be detected without additional sensors and an injection of fuel by means of the second injection valve can be triggered as needed.

BRIEF DESCRIPTION OF THE DRAWING

The invention will be better understood and further objects and advantages thereof will become more apparent from the ensuing detailed description of preferred embodiments taken in conjunction with the single drawing FIGURE which shows a simplified representation of a one-cylinder internal combustion engine with gasoline direct injection and a second injection valve in the intake tube.

DESCRIPTION OF THE PREFERRED EMBODIMENTS

The FIGURE schematically depicts an internal combustion engine 1 of a motor vehicle with gasoline direct injection in which a piston 2 oscillates in a cylinder 3. The cylinder 3 is provided with a combustion chamber 4, which is defined among other things by the piston 2, an inlet valve 5, and an outlet valve 6. An intake tube 7 is provided upstream of the inlet valve 5. The outlet valve 6 is adjoined by an exhaust pipe 8. Naturally, the engine may have a number of cylinders, and several inlet valves 5 and several outlet valves 6 can be provided per cylinder 3.

In the vicinity of the inlet valve 5 and the outlet valve 6, a first injection valve 9 and a spark plug 10 protrude into the combustion chamber 4; fuel can be injected directly into the combustion chamber 4 by means of the first injection valve 9. The spark plug 10 can ignite the fuel in the combustion chamber 4. This type of operation is referred to as gasoline direct injection (GDI).

The intake tube 7 contains a rotatable throttle valve 11 via which the intake tube 7 can be supplied with air. The quantity of the supplied air depends on the angular position of the throttle valve 11. The exhaust pipe 8 contains a catalytic converter 12, which serves to scrub the exhaust gases produced by the combustion of the fuel.

From the exhaust pipe 8, an exhaust recirculation tube 13 leads back to the intake tube 7. The exhaust recirculation tube 13 contains an exhaust recirculation valve 14, which can adjust the quantity of exhaust gas that is recirculated into the intake tube 7. The exhaust recirculation tube 13 and the exhaust recirculation valve 14 constitute the so-called exhaust return.

The intake tube 7 is provided with a second injection valve 15, which is used to inject fuel as needed into the intake tube 7 and thus to prevent the formation of deposits, which are caused by the exhaust recirculation, and to break down possibly existing deposits. The second injection valve 15 can be embodied as a high-pressure or low-pressure injection valve.

The exhaust gases recirculated into the intake tube 7 by means of the exhaust recirculation tube 13 contain soot particles and partially polymerized hydrocarbons. These components of the exhaust gas are deposited in the form of an initially viscous, sticky coating on the inside of the intake tube 7 and on the inlet valve 5. Because of the high operating temperatures of the engine, this coating turns into a hard deposit if it is not removed before hardening. This is the reason why the second injection valve 15 injects fuel into the intake tube 7. Modern fuels contain a multitude of additives; some of these additives serve to reduce the formation of these coatings and deposits. It has been discovered that momentarily injecting fuel into the intake tube 7 can prevent the formation of these deposits and can break down possibly existing deposits.

It is possible to execute the injection of fuel by means of the second injection valve each time the engine is started. In this case, the injection of the fuel by means of the second injection valve 15 occurs at the same time as the mixture enrichment during the warm-up phase so that it does not result in additional consumption of fuel. It has also been discovered to be advantageous for the second injection valve 15 to inject a small quantity of fuel into the intake tube 7 when shutting off the engine because when the engine is off, the fuel remains for a long time in the intake tube 7 and is consequently given a particularly long time to act on possibly existing deposits. It is also possible to detect the formation and presence of deposits in the intake tube 7 and on the inlet valve 5 by means of sensors that are already present and to inject a small quantity of fuel into the intake tube 7 as needed by means of the second injection valve 15. For example, it is conceivable to measure the vacuum in the intake tube when the throttle valve 11 is closed, i.e. when the engine is idling, and to draw conclusions as to the presence of deposits based on the vacuum. For example, the presence of deposits can also be deduced from the ratio of the aspirated air mass and the vacuum in the intake tube 7. The second injection valve 15 can inject fuel into the intake tube 7 as needed.

A control unit 18 controls the spark plug 10, the first injection valve 9, the second injection valve 15, and the throttle valve 11, among other things. The control unit 18 exchanges input signals 19 and output signals 20 with the fuel injection system and the associated sensors and actuators (not shown), for example by means of a data bus.

The foregoing relates to preferred exemplary embodiments of the invention, it being understood that other variants and embodiments thereof are possible within the spirit and scope of the invention, the latter being defined by the appended claims.

We claim:

1. A fuel injection system for an internal combustion engine which operates with gasoline direct injection, the system comprising;
   a high-pressure fuel pump,
   a control unit (18),
   an intake tube (7)
   a first injection valve (9) for each cylinder (3) of the engine, and
   at least one second injection valve (15), the second injection valve (15) being operable to inject fuel into the intake tube (7), and
   further comprising an exhaust recirculation tube (13) feeding into the intake tube (7), and wherein the second injection valve (15) injects fuel into the intake tube (7) between the point at which the exhaust recirculation tube (13) feeds into the intake tube (7) and a combustion chamber (4) of the engine, the control unit being operable to selectively operate the second injection valve (15) in a manner such that fuel is injected into the intake tube (7) only when such injection is needed to keep the intake tube (7) clean.

2. The fuel injection system according to claim 1 wherein the second injection valve (15) is a high-pressure or low-pressure injection valve.

3. A method for operating a fuel injection system for an internal combustion engine which operates with gasoline direct injection, the system comprising;
   a high-pressure fuel pump,
   a control unit (18),
   an intake tube (7)
   a first injection valve (9) for each cylinder (3) of the engine, and at least one second injection valve (15), the second injection valve (15) being operable to inject fuel into the intake tube (7), and further comprising an exhaust recirculation tube (13) feeding into the intake tube (7), and wherein the second injection valve (15) injects fuel into the intake tube (7) between the point at which the exhaust recirculation tube (13) feeds into the intake tube (7) and a combustion chamber (4) of the engine, the method comprising the step of injecting fuel into the intake tube (7) through the second injection valve (15) only when injection of fuel into the intake tube is needed so as to prevent deposits in the intake tube (7) and/or on the inlet valve (5).

4. The method according to claim 4 wherein the second injection valve (15) is employed to inject fuel into the intake tube (7) during the warm-up phase of the engine.

5. The method according to claim 3 wherein the second injection valve (15) is employed to inject fuel into the intake tube (7) when the engine is shut off.

6. The method according to claim 4 wherein the second injection valve (15) is employed to inject fuel into the intake tube (7) when the engine is shut off.

7. The method according to claim 3 wherein the need for the second injection valve (15) to inject fuel so as to prevent deposits is determined by monitoring the vacuum in the intake tube (7) when the engine is idling.

8. The method according to claim 4 wherein the need for the second injection valve (15) to inject fuel so as to prevent deposits is determined by monitoring the vacuum in the intake tube (7) when the engine is idling.

9. The method according to claim 5 wherein the need for the second injection valve (15) to inject fuel so as to prevent deposits is determined by monitoring the vacuum in the intake tube (7) when the engine is idling.

10. The method according to claim 6 wherein the need for the second injection valve (15) to inject fuel so as to prevent deposits is determined by monitoring the vacuum in the intake tube (7) when the engine is idling.

11. A control unit for a fuel injection system, wherein the fuel injection system includes:
   a high-pressure fuel pump,
   the control unit (18),
   an intake tube (7),
   a first injection valve (9) for each cylinder (3) of the engine, and
   at least one second injection valve (15), the second injection valve (15) being operable to inject fuel into the intake tube (7), and
   further comprising an exhaust recirculation tube (13) feeding into the intake tube (7), wherein the second injection valve (15) injects fuel into the intake tube (7) between the point at which the exhaust recirculation tube (13) feeds into the intake tube (7) and a combustion chamber (4) of the engine, wherein
   the control unit (18) is operable for executing the method comprising:
   the step of injecting fuel into the intake tube (7) through the second injection valve (15) only when injection of fuel into the intake tube is needed so as to prevent deposits in the intake tube (7) and/or on the inlet valve (5).

12. A control unit for a fuel injection system as recited in claim 11 wherein the method performed by the system includes that the second injection valve (15) is employed to inject fuel into the intake tube (7) during the warm-up phase of the engine.

13. A control unit for a fuel injection system as recited in claim 11 wherein the method performed by the system includes that the second injection valve (15) is employed to inject fuel into the intake tube (7) when the engine is shut off.

14. A control unit for a fuel injection system as recited in claim 12, wherein the method performed by the system includes that the second injection valve (15) is employed to inject fuel into the intake tube (7) when the engine is shut off.

15. A computer program on a readable medium which operates a fuel injection system for an internal combustion engine with gasoline direct injection, wherein the fuel injection system includes:
   a high-pressure fuel pump,
   a control unit (18),
   an intake tube (7),
   a first injection valve (9) for each cylinder (3) of the engine, and
   at least one second injection valve (15), the second injection valve (15) being operable to inject fuel into the intake tube (7), and
   further comprising an exhaust recirculation tube (13) feeding into the intake tube (7), wherein the second injection valve (15) injects fuel into the intake tube (7) between the point at which the exhaust recirculation tube (13) feeds into the intake tube (7) and a combustion chamber (4) of the engine, the computer program on a readable medium being operable to execute the method which includes the step of injecting fuel into the intake tube (7) through the second injection valve (15) only when injection of fuel into the intake tube is needed so as to prevent deposits in the intake tube (7) and/or on the inlet valve (5).

16. A computer program on a readable medium as recited in claim 15 wherein the computer program is operable to execute the method which further includes that the second injection valve (15) is employed to inject fuel into the intake tube (7) during the warm-up phase of the engine.

17. A computer program on a readable medium as recited in claim 15 wherein the computer program is operable to execute the method which further includes that the second injection valve (15) is employed to inject fuel into the intake tube (7) when the engine is shut off.

18. A computer program on a readable medium as recited in claim 16, wherein the computer program is operable to execute the method which further includes that the second injection valve (15) is employed to inject fuel into the intake tube (7) when the engine is shut off.

\* \* \* \* \*